(12) United States Patent
Golubovic et al.

(10) Patent No.: US 7,660,096 B2
(45) Date of Patent: Feb. 9, 2010

(54) CIRCUIT PROTECTION DEVICE HAVING THERMALLY COUPLED MOV OVERVOLTAGE ELEMENT AND PPTC OVERCURRENT ELEMENT

(75) Inventors: Boris Golubovic, San Francisco, CA (US); Paul N. Becker, San Carlos, CA (US); Robert P. Moore, Redwood City, CA (US)

(73) Assignee: Tyco Electronics Corporation, Middletown, PA (US)

( * ) Notice: Subject to any disclaimer, the term of this patent is extended or adjusted under 35 U.S.C. 154(b) by 728 days.

(21) Appl. No.: 11/495,200

(22) Filed: Jul. 28, 2006

(65) Prior Publication Data
US 2007/0025044 A1 Feb. 1, 2007

Related U.S. Application Data (60) Provisional application No. 60/703,663, filed on Jul. 29, 2005.

(51) Int. Cl.
*H02H 1/00* (2006.01)
*H02H 1/04* (2006.01)
*H02H 3/22* (2006.01)
*H02H 9/06* (2006.01)
*H01C 7/12* (2006.01)
*H02H 3/20* (2006.01)
*H02H 9/04* (2006.01)
*H02H 5/04* (2006.01)

(52) U.S. Cl. ............... 361/124; 361/117; 361/118; 361/119; 361/91.1; 361/103

(58) Field of Classification Search ............... None
See application file for complete search history.

(56) References Cited

U.S. PATENT DOCUMENTS

| | | | |
|---|---|---|---|
| 3,708,720 A | 1/1973 | Whitney et al. | 361/27 |
| 4,237,441 A | 12/1980 | Van Konynenburg et al. | 338/22 R |
| 4,317,027 A | 2/1982 | Middleman et al. | 219/553 |
| 4,545,926 A | 10/1985 | Fouts et al. | 252/511 |
| 4,724,417 A | 2/1988 | Au et al. | 338/22 R |
| 4,774,024 A | 9/1988 | Deep et al. | 252/511 |
| 4,780,598 A | 10/1988 | Fahey et al. | 219/511 |
| 4,935,156 A | 6/1990 | Van Konynenburg et al. | 219/553 |
| 5,049,850 A | 9/1991 | Evans et al. | 338/22 R |
| 5,250,228 A | 10/1993 | Baigrie et al. | 252/511 |
| 5,378,407 A | 1/1995 | Chandler et al. | 252/513 |
| 5,379,022 A | 1/1995 | Bacon et al. | 338/20 |
| 5,379,176 A | 1/1995 | Bacon et al. | 361/106 |
| 5,451,919 A | 9/1995 | Chu et al. | 338/22 R |
| 5,747,147 A | 5/1998 | Wartenberg et al. | 428/209 |

(Continued)

FOREIGN PATENT DOCUMENTS

JP 01-310509 A 12/1989

(Continued)

*Primary Examiner*—Albert W Paladini
*Assistant Examiner*—Dharti H Patel (57) ABSTRACT

In a composite electrical circuit protection device, thermal coupling between a planar PPTC element and a planar MOV element is controlled by insertion of a thermal mass material for regulating heat transfer from the MOV element to the PPTC element, such that a PPTC resistor hot zone forms consistently away from the planar major foil electrode confronting the MOV thereby regulating heat transfer from the MOV to the PPTC resistor.

19 Claims, 3 Drawing Sheets

U.S. PATENT DOCUMENTS

| | | | | |
|---|---|---|---|---|
| 5,781,394 | A | * | 7/1998 | Lorenz et al. ............... 361/124 |
| 6,130,597 | A | | 10/2000 | Toth et al. ................. 338/22 R |
| 6,282,074 | B1 | | 8/2001 | Anthony .................... 361/106 |
| 6,518,731 | B2 | | 2/2003 | Thomas et al. ............. 320/136 |
| 6,628,498 | B2 | * | 9/2003 | Whitney et al. ............ 361/119 |
| 6,700,766 | B2 | | 3/2004 | Sato ......................... 361/93.1 |

FOREIGN PATENT DOCUMENTS

| | | |
|---|---|---|
| JP | 10-144506 A | 5/1998 |
| JP | 11-097215 A | 4/1999 |

\* cited by examiner

CIRCUIT PROTECTION DEVICE HAVING THERMALLY COUPLED MOV OVERVOLTAGE ELEMENT AND PPTC OVERCURRENT ELEMENT

CROSS-REFERENCE TO RELATED APPLICATIONS

This application is an application under 35 USC 111(a) and claims priority under 35 USC 119 from Provisional Application Ser. No. 60/703,663, filed Jul. 29, 2005 under 35 USC 111(b). The disclosure of that provisional application is incorporated herein by reference.

BACKGROUND OF THE INVENTION

1. Field of the Invention

The present invention relates to a composite electrical circuit protection device for protecting against overvoltage/overcurrent transient conditions and including a planar metal oxide varistor ("MOV") overvoltage element that is critically coupled thermally to a planar polymeric positive temperature coefficient ("PPTC") overcurrent element such that heat generated in the MOV element is effectively transferred to trip the PPTC element before the MOV element is irreversibly damaged, and without irreversible damage being caused to the PPTC element.

2. Introduction to the Invention

It is known in the art to provide composite circuit protection devices including overvoltage protection elements and overcurrent protection elements in thermally coupled relationships. Where thermal coupling between such elements has been provided, the design approach has been to maximize the transfer of heat from a heat-generating element to a heat-triggered element. One known example of an overvoltage protection element is a metal oxide varistor or "MOV". One known example of an overcurrent protection device is a thermistor. For example, a composite device employing series-connected thermistors and parallel or shunt connected MOVs is described in U.S. Pat. Nos. 5,379,176 and 5,379,022, wherein thermistors and varistors, formed as solid cylindrical slugs from bulk material (e.g., barium titanate for the thermistor), are joined end-to-end by sheet metal spacers to form a composite circuit protection device "for optimizing heat transfer" in order to protect electronic measurement devices such as a digital multimeter from out-of-range overvoltage impulse events and out-of-range overcurrent conditions.

Figure 3:
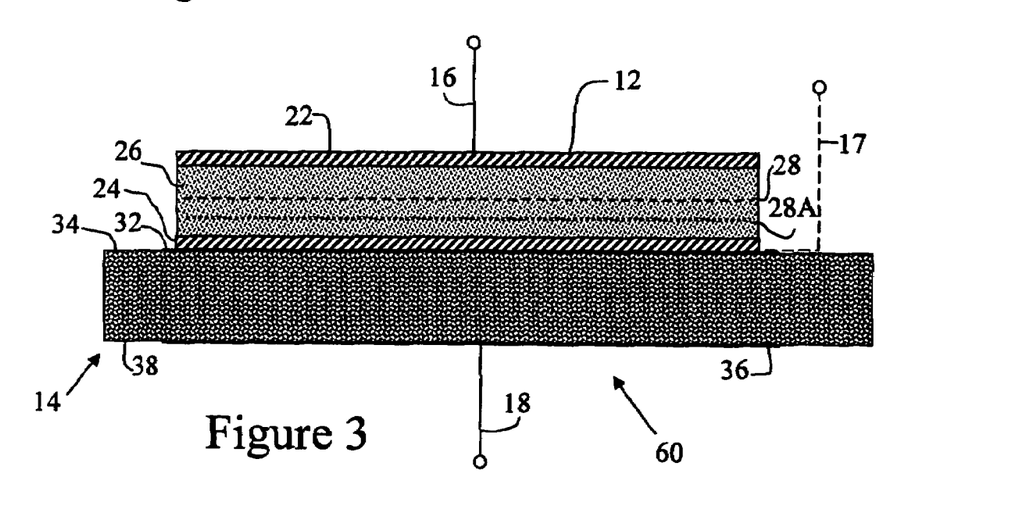
FIG. 3 is an enlarged conceptual drawing in side elevation showing a planar PPTC element in direct thermal contact with a major surface of a MOV element, illustrative of the displacement of the PPTC element hot zone toward the MOV and consequent likelihood of irreversible damage occurring to the PPTC element.
Figure 4:
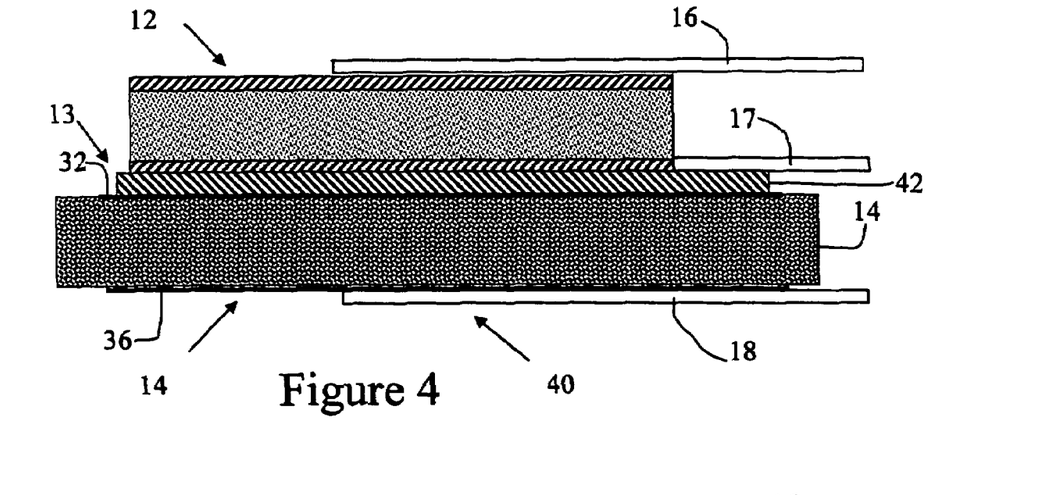
FIG. 4 is an enlarged structural drawing in side elevation and vertical section showing a metal thermal mass material (spacer element) between a planar PPTC element and a major surface of a MOV element in accordance with principles of the present invention.

Another example of a composite thermistor-varistor protection device is set forth in U.S. Pat. No. 6,282,074. Therein, FIGS. 3 and 4 illustrate a fuse device comprising a MOV cylindrical element surrounding and directly contacting an interior cylindrical PPTC element.

MOVs are voltage-dependent, non-linear electrical elements typically composed primarily of zinc oxide with small trace amounts of other metals and oxides. The mixed materials comprising the MOV are formed by application of intense pressure and temperature in a sintering operation and thereby shaped into a final physical form such as a thin disk having a complex zinc oxide micrograin structure. Major surfaces of the MOV are provided with conductive metal (e.g., copper or silver-glass) formations or depositions to enable terminal leads or other connections to be made thereto. Desirably, MOVs have electrical I-V characteristics which resemble avalanche breakdown characteristics of back-to-back-connected zener diodes. Since each MOV in effect comprises a multiplicity of semiconductor junctions at the zinc oxide grain boundaries, the MOV acts very rapidly in response to an overvoltage condition, generating potentially a considerable amount of heat across substantially the entire disk surface while clamping the voltage to a nominal level. Thus, it would be desirable to transfer this distributed heat in an effective manner to a slower-acting overcurrent protection element, most preferably in the form of a polymeric positive temperature coefficient ("PPTC") resistor element thereby to accelerate trip of the PPTC resistor device to its very high resistance state.

Stand-alone polymer PTC devices are well known. Particularly useful devices contain PTC elements composed of a PTC conductive polymer, i.e. a composition comprising an organic polymer and, dispersed or otherwise distributed therein, a particulate conductive filler, e.g. carbon black, or a metal or a conductive metal compound. Such devices are referred to herein as polymer PTC, or PPTC resistors, PPTC devices and/or PPTC elements. Suitable conductive polymer compositions and structural components, and methods for producing the same, are disclosed for example in U.S. Pat. Nos. 4,237,441 (van Konynenburg et al.), 4,545,926 (Fouts et al.), 4,724,417 (Au et al.), 4,774,024 (Deep et al.), 4,935,156 (van Konynenburg et al.), 5,049,850 (Evans et al.), 5,250,228 (Baigrie et al.), 5,378,407 (Chandler et al.), 5,451,919 (Chu et al.), 5,747,147 (Wartenberg et al.) and 6,130,597 (Toth et al.), the disclosures of which are hereby incorporated herein by reference.

As used herein, the term "PTC" is used to mean a composition of matter which has an $R_{14}$ value of at least 2.5 and/or an $R_{100}$ value of at least 10, and it is preferred that the composition should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Generally the compositions used in devices of the present invention show increases in resistivity that are much greater than those minimum values.

Polymeric PTC resistive devices can be used in a number of different ways, and are particularly useful in circuit protection applications, in which they function as remotely resettable devices to help protect electrical components from damage caused by excessive currents and/or temperatures. Components which can be protected in this way include motors, batteries, battery chargers, loudspeakers, wiring harnesses in automobiles, telecommunications equipment and circuits, and other electrical and electronic components, circuits and devices. The use of PPTC resistive elements, components and devices in this way has grown rapidly over recent years, and continues to increase.

It is known to provide PPTC resistor devices or elements in protective electrical connection and thermal contact with electronic components such as zener diodes, metal oxide semiconductor field effect transistors (MOSFETs), and more complex integrated circuits forming voltage/current regulators, as exemplified by the teachings and disclosures set forth in commonly assigned U.S. Pat. No. 6,518,731 (Thomas et al.), the disclosure of which is incorporated herein by reference. Also, see for example U.S. Pat. No. 3,708,720 (Whitney et al.) and U.S. Pat. No. 6,700,766 (Sato). Also note commonly assigned U.S. Pat. No. 4,780,598 (Fahey et al.) which describes PPTC elements that are thermally coupled by thermally conductive electrical insulator material to other circuit elements such as a voltage dependent resistor.

When sufficient current passes through a PPTC device, it reaches a critical or trip value at which a very large proportion of the heating (and voltage drop) nearly always takes place over a very small proportion of the volume of the device. This small proportion is referred to herein as the "hot line" or "hot zone", see, e.g. U.S. Pat. No. 4,317,027 (Middleman et al.). It is generally understood that increasing the thickness of the PPTC layer will increase a protection device's ability to withstand higher voltages, but we have discovered that merely scaling the thickness of the PPTC layer using existing device geometries has not led to satisfactory high voltage circuit protection devices. Thus in order to realize an improved circuit protection device, it would be desirable to combine the overcurrent protection properties of the PPTC resistor element with the overvoltage protection properties of the MOV in an effective way that synergistically realizes full benefit of both protection elements in the single composite device.

Other PTC materials are also known, e.g. doped ceramics such as barium titanate, but are not as generally useful as PTC conductive polymer material in power protection applications, in particular because ceramics have higher non-operating, quiescent resistivities and also have Curie transition temperature levels that are higher than the transition temperatures associated with the trip to a high resistance state of a PPTC resistor.

In the telecommunications field, tip and ring wires of a communications pair may inadvertently induce or come into direct contact with a source of high voltage potential, such as a lightning strike or AC power induction or contact. Telecom protection devices must be capable of withstanding the high voltages and resultant high currents encountered in such events. Heretofore, leaded-style PPTC devices have been employed in high voltage electrical applications, particularly in the telecommunications field. Traditional leaded-style devices route current from the circuit board up through the leads to the metal foil electrodes. The leads serve as the terminals and the interconnection to the PPTC device's metal foil electrodes. Since the prior leaded PPTC devices are symmetrical, electrical conduction occurs in a direction through the PTC composite material that is normal or perpendicular to the oppositely facing metal foil electrodes. Thus, a thermal hot zone (and zone of maximum potential difference) is nominally formed as a thin planar region generally equidistant from, and parallel to, the metal foils of the PPTC resistor.

While the teachings of U.S. Pat. No. 6,282,074 noted above illustrate a PPTC cylindrical layer in direct contact with a MOV cylindrical layer within a bolt-shaped fuse structure, we have discovered that satisfactory results have not been obtained by optimizing or maximizing thermal transfer from a MOV element to a PPTC element, such as by placing a planar PPTC laminar device in direct contact with a facing planar surface of a MOV device, without a high likelihood of composite device failure. We attribute this likelihood of failure directly to the fact that when a major foil electrode of the PPTC element is positioned in direct contact with a major face of the MOV, heat generated within the MOV causes the PPTC resistor's hot zone to move closer to the major foil electrode, leading directly to PPTC element voltage breakdown and consequent failure.

Conversely, if the thermal coupling between the PPTC element and the MOV element is poor or essentially non-existent, the MOV element can fail due to excessive current flow caused by the overvoltage event and the failure of the PPTC element to heat up and trip in sufficient time to protect the MOV from irreversible failure.

BRIEF SUMMARY OF THE INVENTION

We have discovered that thermal coupling between a planar PPTC element and a planar MOV element can be controlled by insertion of a thermal mass material directly between the PPTC element and the MOV element, such as a metallic spacer and/or solder (either singly or in combination with a conductive or non-conductive adhesive material), or other means, in a manner causing the PPTC resistor hot zone to form consistently away from the planar major foil electrode confronting the MOV, thereby critically regulating the transfer of heat from the MOV element to the PPTC resistor element.

Therefore, a general object of the present invention is to provide a critical thermal mass for regulating transfer of heat from a MOV element to trip a PPTC element of a composite electrical circuit protection device such that heat generated in the MOV element is effectively transferred to trip the PPTC element before the MOV element is irreversibly damaged and without irreversible damage thereby being caused to the PPTC element.

Another object of the present invention is to couple the overcurrent protection properties of the PPTC element with the overvoltage protection properties of the MOV element in an effective way that synergistically realizes full benefit of both protection elements in a single composite electrical circuit protection device that includes a thermal mass material for separating the PPTC element and the MOV element and for regulating transfer of heat from the MOV element to the PPTC element.

A further object of the present invention is to provide a composite electrical circuit protection device which includes a thermal mass material for electrically and thermally coupling a major surface of a PPTC resistor and a facing major surface of a MOV element in a manner overcoming limitations and drawbacks of the prior art.

In accordance with principles of the present invention, a composite circuit protection device includes a PPTC resistive element having first and second major planar surfaces, a first electrode formed at the first major planar surface and in intimate electrical contact therewith, and a second electrode formed at the second major planar surface and in intimate electrical contact therewith; a MOV element having third and fourth major planar electrode surfaces; a thermal mass material of predetermined shape and thickness forming and occupying a space separating the PPTC and the MOV and a connector element for connecting the second electrode and the third major electrode surface; a device first terminal connection at the first electrode; and a device second terminal connection at the fourth major electrode surface.

In one aspect, the present invention comprises a two-terminal device, wherein in another aspect, the present invention comprises a three-terminal device where a third terminal is established at the connector element.

In a related aspect, the thermal mass material is a metal plate, or solder material or connector lead also forming the connector element. Alternatively, the spacer element may surround or cooperate with a conductive or non-conductive epoxy resin spacer material. Thickness of thermal mass material most preferably lies in a range of 0.28 mm (0.011 inch) and 2.8 mm (0.11 inch).

These and other objects, advantages, aspects and features of the present invention will be more fully understood and appreciated upon consideration of the detailed description of preferred embodiments presented in conjunction with the following drawings.

DETAILED DESCRIPTION OF THE INVENTION

Figure 1:
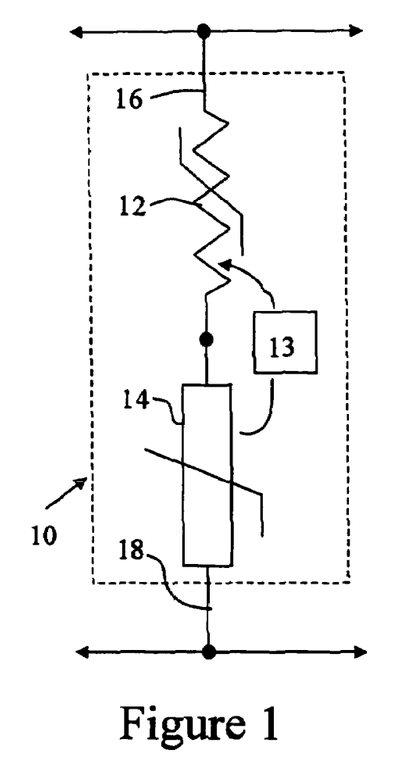
FIG. 1 is an electrical circuit schematic diagram of a composite two-terminal electrical circuit protection device comprising a planar PPTC resistor element electrically and thermally coupled to a planar MOV element in accordance with principles of the present invention.

In accordance with principles of the present invention, a two-terminal electrical circuit protection device 10 is depicted by the FIG. 1 electrical circuit schematic diagram. The composite device 10 includes a planar PPTC resistor element 12 and a planar MOV element 14. The PPTC element 12 and the MOV element 14 are electrically connected in series and are also thermally connected together via an intermediate thermal mass 13 in accordance with principles of the present invention. The two-terminal composite device 10 has a first device connector lead or pad 16 and a second device connector lead or pad 18. The composite device 10 is intended to function as a shunt protection circuit with lead 16 connected to a power supply conductor and lead 18 connected to a return or ground conductor. Typically, the two-terminal device 10 is used in industrial applications such as surge protection of motors, electrical outlet power strips, or control systems, to assure compliance with overcurrent/overvoltage conditions as required by various industry and regulatory standards, such as Underwriter Laboratories Standard No. UL 1449.

Figure 2:
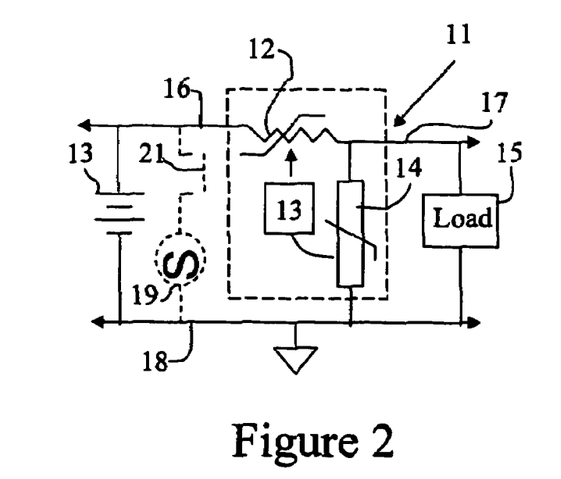
FIG. 2 is an electrical circuit schematic diagram of a composite three-terminal electrical circuit protection device comprising a planar PPTC resistor element electrically and thermally coupled to a planar MOV element, the protection device being connected and operating within an electrical circuit arrangement subject to overvoltage/overcurrent sources and events, in accordance with principles of the present invention.

A composite three-terminal circuit protection device 11 is shown in the FIG. 2 electrical circuit schematic diagram, and includes a supply input lead 16 connected to a power source such as a battery voltage supply 13 of a telecommunications central office facility, a supply outlet lead 17 for connecting a common electrical node of the PPTC element and the MOV element to an input of an electrical load 15 such as telecommunications circuits or equipment, and a return lead 18 connected to both the power source 13 and the power load 15 return lines. Otherwise, the device 11 is essentially the same as the device 10 of FIG. 1. FIG. 2 also includes a source 19 of overvoltage/overcurrent, such as alternating current from lightning, AC induction or short, and a source of intermittency, graphed by a normally-open switch 21. Ordinarily, the protection device 11 is quiescent and electrically transparent to the power source 13 and the electrical load 15, with the PPTC element 12 presenting a very low series resistance between leads 16 and 17, and with the MOV element 14 presenting a very high parallel resistance between leads 17 and 18. However, when an overvoltage/overcurrent condition is caused by source 19/switch 21, the MOV element 14 acts very rapidly to limit voltage reaching the load 15 to a rated maximum voltage level. In limiting the voltage, the MOV element 14 generates considerable heat which is transferred in a controlled manner via a thermal mass 13 to the PPTC element 12 to accelerate tripping to a high impedance state before the MOV element becomes damaged and without causing the PPTC element to be damaged from receiving too much heat too quickly. The three-terminal device 11 is well suited for combined overcurrent and overvoltage protection in telecom applications, for compliance with standards such as UL 60950, TIA-968-A, ITU-T K.20/K.21, and similar standards, or industrial applications where a trip indicator feature can be sensed at the third connector lead 17 and used to control an indicator or an alarm. Those skilled in the art will readily appreciate that the shunt circuit protection device 10 of FIG. 1 may be substituted in place of the three-terminal series-shunt circuit protection device 11 of FIG. 2, depending upon a particular circuit application.

Turning to the FIG. 3 structural view, a composite electrical circuit protection device 60 illustrates problems arising from placement of the PPTC element 12 in direct thermal contact with the MOV element 14 without the protective thermal mass 13. In the FIG. 3 exemplary device 60 the planar PPTC element 12 includes a top foil layer 22 providing a connection region for connection lead 16, a bottom foil layer 24, and a layer 26 of PPTC material sandwiched between the top layer 22 and bottom layer 24, in a conventional PPTC structural arrangement. The bottom foil layer 24 is secured directly to, for example, a glass-silver raised plateau connection region 32 formed by printing and firing on a major face 34 of the ceramic MOV 14. (A similar plateau region 36 is present on an opposite major face 38 of the MOV 14 and provides a connection region for connection lead 18). Under nominal operating conditions, a hot zone, depicted by dashed line 28 exists in the PPTC material layer 26 equidistantly from the foil layers 22 and 24. However, when an overvoltage condition appears across the terminals 16 and 18 of the device, the MOV 14 conducts at its knee voltage characteristic and begins to absorb considerable electrical energy, converting the absorbed electrical energy into heat. This heat is transferred directly to the PPTC element 12 and causes the hot zone to move toward the MOV element 14, as depicted by dashed line 28A (below line 28). Since the hot zone is now close to the lower foil 24, the voltage breakdown of the PPTC element has become lowered, leading to a possible irreversible failure of the PPTC element 12. In this example with the hot zone deviating toward the foil electrode 24 as depicted by dashed line 28A, arcing and the creation of arc tracks of carbonized conductive material can be formed in the PPTC polymer layer 26, resulting in the irreversible failure of the PPTC element 12 and of the composite device 60. FIG. 3 therefore illustrates why optimal or maximal heat transfer from the MOV element 14 to the PPTC element 12 yields a less than satisfactory composite circuit protection device employing one or more PPTC resistor elements.

On the other hand, if the PPTC element 12 is not sufficiently thermally coupled to the MOV element 14, the MOV element 14 can easily overheat and fail before the PPTC element 12 trips as a result of internal heating therein from overcurrent, thereby resulting in irreversible failure of the MOV element 14 and consequent failure of the composite two-terminal FIG. 1 protection device 10 or the composite three-terminal FIG. 2 protection device 11.

In making the present invention we discovered that transfer of heat to a planar PPTC element must be regulated or controlled in relation to a temperature versus time curve characterizing a MOV element in response to a high voltage transient condition. We have further discovered that by providing a thermal mass 13 in a space between the planar PPTC element 12 and the planar MOV element 14, the thermal mass 13 including heat transfer material, the transfer of heat from the MOV element 14 to the PPTC element 12 can be regulated and controlled in a manner enabling an adequate amount of heat to be transferred to the PPTC element without unduly distorting the PPTC element's hot zone and without resulting in irreversible failure of the MOV element, such that the composite device 10 or 11 will perform very well in passing industry circuit protection standards, particularly in the high voltage telecom area.

The thickness of the thermal mass depends on the type of material used, the thermal conductivity of the thermal mass material, and the configuration of the device. The thickness is an average thickness to accommodate nonuniformities and differing shapes, e.g. tapered shapes. Generally the thermal mass has a thickness of 0.013 to 6.35 mm (0.0005 to 0.25 in), preferably 0.025 to 5.1 mm (0.001 to 0.2 in), particularly 0.25 to 5.1 mm (0.01 to 0.2 inch), especially 0.25 to 1.3 mm (0.01 to 0.05 in). Useful devices have been prepared when the average thickness of the MOV is 9.5 to 10.1 mm (0.37 to 0.40 in), but other MOV thicknesses can be used.

In FIGS. 4, 5, 5A, 6, and 7A, 7B, 7C and 7D, elements which are essentially unchanged from FIG. 3 carry the same reference numerals given in FIG. 3. FIG. 4 illustrates a device 40 in which the thermal mass comprises a metal spacer 42 for separating the PPTC element 12 from the MOV element 14.

Figure 5:
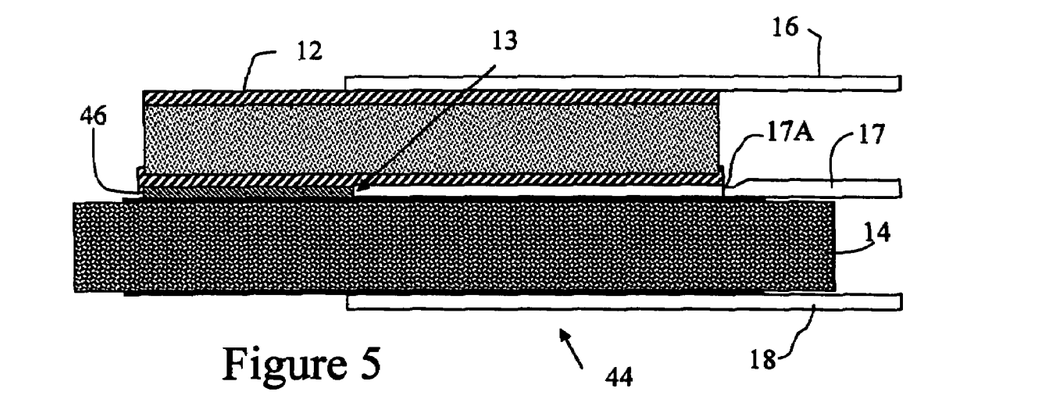
FIG. 5 is an enlarged structural drawing in side elevation and vertical section showing a flattened connection lead and solder infill between a planar PPTC element and a major surface of a MOV element in accordance with principles of the present invention.
Figure 5A:
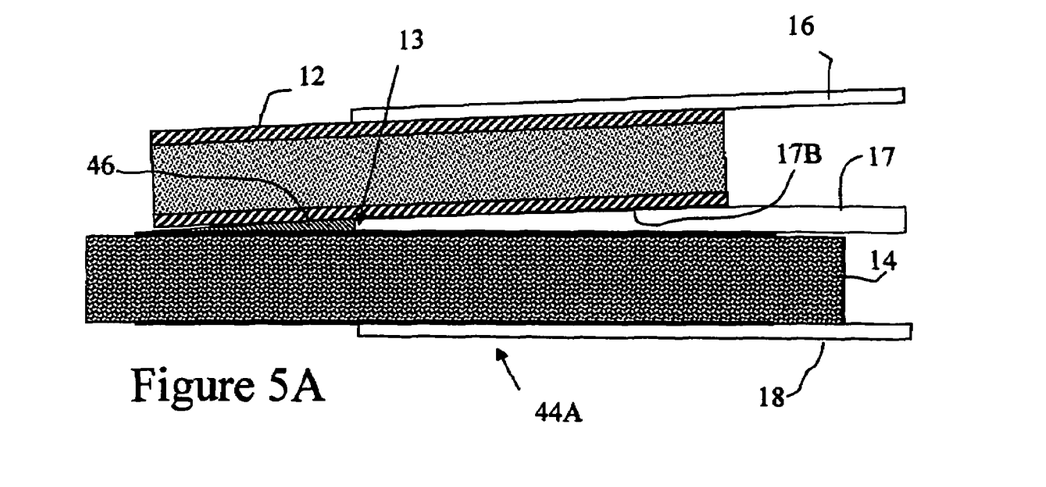
FIG. 5A is an enlarged structural drawing in side elevation and vertical section of a composite device similar to the one shown in FIG. 5 wherein the connection lead has been flattened into a taper shape, in accordance with principles of the present invention.

FIG. 5 illustrates a device 44 in which the thermal mass 13 includes a flattened paddle portion 17A of connector lead 17 and solder infill 46 surrounding the flattened paddle portion 17. FIG. 5A illustrates a device 44A in which the connector lead 17 has had an end 17B that has been slightly tapered by coining or stamping, such that the PPTC element 12 is mounted at a slight angle relative to the MOV element 14. FIG. 5A illustrates that the two elements 12 and 14 need not be perfectly coplanar as is the case in the FIG. 5 example. In the case of FIGS. 5 and 5A those skilled in the art will appreciate that the wire end forming the spacer can be flattened or it can be formed into another suitable shape establishing the desired spacer, such as a zig-zag shape, a hook shape, a loop shape, or other suitable shape, with or without coining or flattening.

Figure 6:
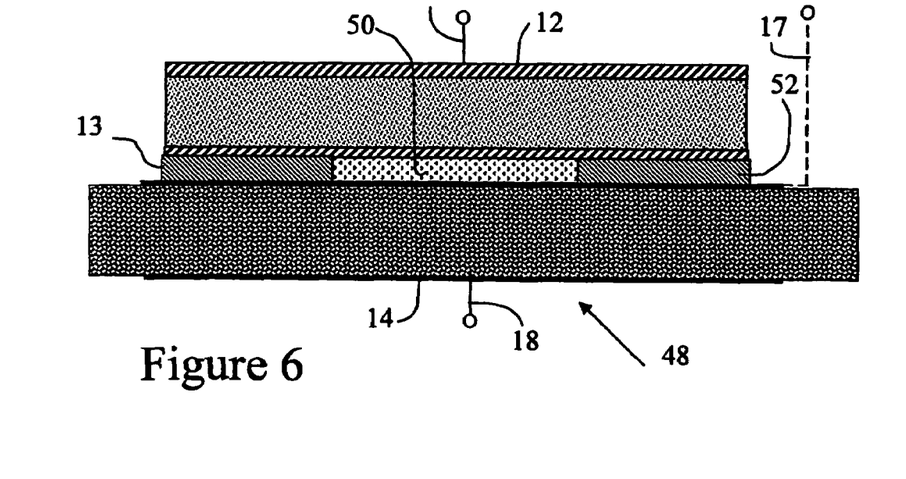
FIG. 6 is an enlarged conceptual drawing in side elevation showing a non-conductive spacer establishing a gap between a planar PPTC element and a major surface of a MOV element, a peripheral region of the gap being infilled with conductive material, in accordance with principles of the present invention.

FIG. 6 illustrates a device 48 in which a PPTC element 12 is spaced away from a MOV element 14 by placement and heat-cure of an adhesive blob or dot 50. The central spacer material 50 may be thermally and/or electrically conductive or non-conductive. A solder ring 52 surrounds the central spacer dot 52 and comprises the thermal mass 13 providing controlled thermal coupling as well as electrical connection between facing major surfaces of the PPTC element 12 and the MOV element 14.

Two-terminal and three-terminal composite circuit protection devices of the present invention may be formed with connector leads and a protective coating, or for direct surface mounting, as will be readily understood and appreciated by those skilled in the art.

A series of composite protection devices including devices 40, 44, 44A, 48, were assembled. Some, but not all, of the devices were generally in accordance with principles of the present invention and included a PPTC chip 12, a thermal mass 13 and a MOV disk 14. For example, devices 40 were assembled by combining the PPTC element 12 having approximate dimensions of 5.5 mm by 5.5-mm by 2.2 mm, a metal spacer element 42 having a thickness of approximately 0.29 mm (0.0115 inch), and a MOV leaded disk element 14 having a disk diameter of 10 mm and a thickness of 1.3 mm. The PPTC element 12 used is nominally rated for a maximum operating voltage of 60 volts, a maximum trip voltage of 250 volts and a maximum trip current of 3 amperes. The MOV element 14 used is nominally rated at 270 volts DC (175 VAC maximum), a maximum clamping voltage of 455 VDC, a surge current (8×20 μs) of 1750 amperes and a wattage rating of 0.25 watts. The devices, including devices 40, were then subjected to testing including a 600 volt/5 ampere/5 second test that is within a range of test currents covered in the UL60950 telecom standard. Devices in accordance with principles of the present invention passed this testing without irreversible failure, while devices that were optimized for heat transfer (FIG. 3), or were not thermally coupled, failed this test. The following table sets forth test results for device examples in accordance with FIGS. 3, 4, 5, 5A and 6, and with no thermal coupling.

TABLE

| Spacing Thickness | Spacing Material | Results |
|---|---|---|
| FIG. 3, No Spacing (Direct PPTC-MOV contact) | None | PPTC chip arc-tracks at applied short circuit currents in 3-5 A range |
| FIG. 4: 0.29 mm (0.0115 in) | Metal plate | No failures observed |
| FIG. 5A: 0.28-0.51 mm (0.011-0.020 in) | Coined (tapered) lead | No failures observed |
| FIG. 6: 2.42 mm (0.0953 in) | Epoxy dot, nonconductive Epibond 7275 adhesive*, solder infill | No failures observed |
| FIG. 6: 2.61 mm (0.103 in) | Epoxy dot, Epibond 7275 adhesive*, solder infill | No failures observed |
| Prior Art: 2 separate devices | Air | MOV damaged (electrical short) at applied short currents 0.5-4.5 A range |

*Epibond 7275 is a non-conductive surface mount adhesive, available from Alpha Metals (a Cookson Co.).

A practical device embodying principles of the present invention is illustrated in FIGS. 7A, 7B, 7C, and 7D. Therein, a composite three-terminal circuit protection device 70 is specifically adapted for use in the telecommunications field. The device 70 includes a PPTC element 12, and a MOV element 14. A spacer is formed between the PPTC element 12 and the MOV element 14. While the spacer may be in accordance with the teachings of FIG. 4 or 6, most preferably the spacer is in the form of a slightly tapered connection lead in accordance with the teachings of FIG. 5A. Terminal leads 16, 17 and 18 formed of tin-plated #24 gauge copper wire enable the composite device to be connected to protect telecommunications equipment. The MOV element 14 is most preferably a thin ceramic disk comprising zinc oxide having an outer diameter of approximately 10 mm (0.39 inch) and a thickness of approximately 1.3 mm. The PPTC element 12 is generally a square or slightly tapered box shape (e.g. 5.5 mm by 5.5 mm by 2.2 mm), typically stamped from a sandwich sheet of PPTC and foil electrode layers, having side dimensions lying within the diameter of the MOV disk. The composite device 70 has a thickness of approximately 6 mm (0.24 inches). The PPTC element 12 between terminal leads 16 and 17 has a nominal operating voltage of 60 VDC, a fault voltage of 250 VAC RMS and an interrupt or trip current of 3 A RMS, for example. The MOV element 14 between terminal leads 17 and 18 has a nominal AC voltage rating of 175 V RMS, for example. The terminal lead 17 has an end 17B which has been flattened or coined to a predetermined optimum thickness typically having a slight taper, and forms an initial spacer for providing optimum spacing between the PPTC element 12 and the MOV element 14.

Figure 7A:
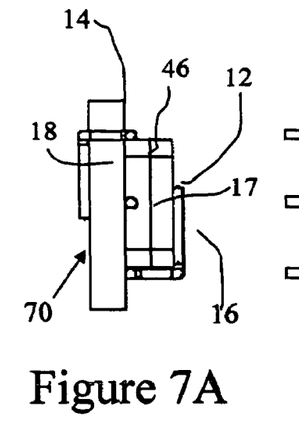
FIGS. 7A, 7B, 7C and 7D set forth enlarged bottom, side, top and edge structural views of a practical embodiment of the present invention.
Figure 7B:
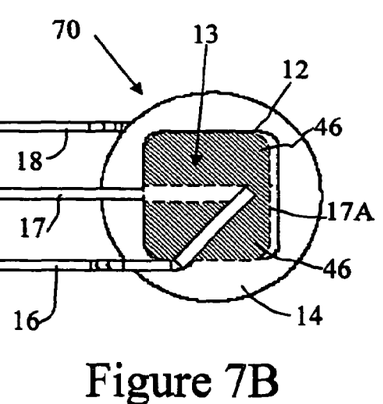
Figure 7C:
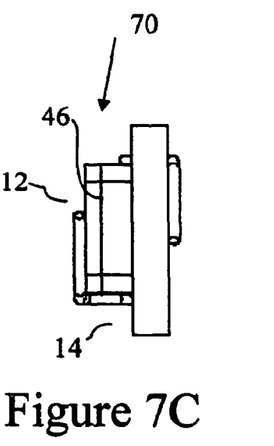
Figure 7D:
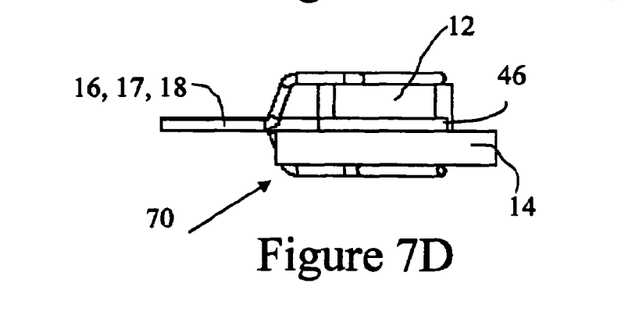

During assembly of the device 70, the PPTC element 12 and the MOV element 14 are provided with connector leads 16 and 18 which are commonly joined together at distal ends by e.g. a paper tape and thereby hold the two elements together via a slight spring bias force. The tapered paddle end 17B of connector 17 is then inserted between the PPTC element 12 and the MOV element 14 to form the spacer. The composite device 70 is then coated with flux and placed in a solder bath, so that solder 46 flows into the space between the PPTC device 12 and the MOV device not occupied by the flattened spacer portion 17B of the connection lead 17 as shown in the X-ray side view of FIG. 7B. The combination of the flattened spacer portion 17B and the solder regions 46 provides critically controlled thermal conductivity between the two protection elements 12 and 14 as well as providing an electrical connection therebetween, thereby overcoming the drawbacks noted with the FIG. 3 example 50 and the drawbacks of ineffective thermal coupling, discussed hereinabove. Following final assembly and test, the composite protection device 70 may be provided with a protective plastic or resin coating as is typically provided for discrete PPTC devices and MOV devices. Also, the leads 16, 17 and 18 may be formed into an in-line array as shown in FIGS. 7B and 7D, for example, and separated from the paper tape used in the manufacturing process.

Devices in accordance with the invention passed a 600 volt/5 ampere/5 second test. However, such devices are useful over a range of different voltage and current conditions, e.g. 250 to 600 volts and 0.5 to 40 A, depending on the specific circuit conditions.

Having thus described preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Therefore, the disclosures and descriptions herein are purely illustrative and are not intended to be in any sense limiting.

What is claimed is:

1. A composite circuit protection device comprising:
    a polymeric positive temperature coefficient ("PPTC") element having first and second planar major surfaces, a first electrode sheet formed at the first planar major surface and in intimate electrical contact therewith, and a second electrode sheet formed at the second planar major surface and in intimate electrical contact therewith;
    a metal oxide varistor ("MOV") element having third and fourth planar major electrode surfaces;
    a thermal mass material of predetermined thickness and shape between facing second and third planar major surfaces of the PPTC element and the MOV element for controlling transfer of heat from the MOV element to the PPTC element such that the PPTC element trips to a high resistance state before the MOV element reaches a failure temperature, and for electrically connecting the second electrode sheet and the third major electrode surface;
    a device first terminal connection at the first electrode; and,
    a device second terminal connection at the fourth major electrode surface.

2. The composite circuit protection device set forth in claim 1 wherein the first terminal connection is a first connector lead and wherein the second terminal connection is a second connector lead.

3. The composite circuit protection device set forth in claim 1 wherein a device third terminal connection is made between the second electrode sheet and the third major electrode surface.

4. The composite circuit protection device set forth in claim 3 wherein the third terminal connection comprises a third connector lead.

5. The composite circuit protection device set forth in claim 1 wherein the thermal mass material comprises a metal plate.

6. The composite circuit protection device set forth in claim 5 wherein the metal plate has an average thickness of approximately 0.025 mm to approximately 2.5 mm (0.001 to 0.100 in).

7. The composite circuit protection device set forth in claim 3 wherein the thermal mass material comprises an end portion of the third connector lead and a solder material infilling space defined by the second and third major surfaces not occupied by the end portion.

8. The composite circuit protection device set forth in claim 7 wherein the end portion has been formed to a flattened shape.

9. The composite circuit protection device set forth in claim 8 wherein the flattened shape has a taper.

10. The composite circuit protection device set forth in claim 7 wherein the end portion has a thickness in a range of 0.25 mm (0.010 in) and 0.51 mm (0.020 in).

11. The composite circuit protection device set forth in claim 1 wherein the second and third major faces are spaced apart by a centrally located dot of adhesive material and wherein the thermal mass material comprises a solder material surrounding the dot and infilling space between the second and third major faces not occupied by the dot.

12. The composite circuit protection device set forth in claim 11 wherein the adhesive material has a thickness in a range of 0.25 mm (0.01 in) and 5 mm (0.2 in).

13. An electrical circuit comprising:
    a power supply for supplying a nominal amount of operating power;
    an electrical load normally connected to receive the operating power; and,
    a shunt composite circuit protection device connected across the electrical load for responding to a source of transient overvoltage/overcurrent conditions occurring in the electrical circuit between the power supply and the device and comprising:

a polymeric positive temperature coefficient ("PPTC") element having first and second planar major surfaces, a first electrode sheet formed at the first planar major surface and in intimate electrical contact therewith and comprising a device first electrical circuit connection to the load, and a second electrode sheet formed at the second planar major surface and in intimate electrical contact therewith;

a metal oxide varistor ("MOV") element connected in parallel across the electrical load and having a third planar major electrode surface and a fourth planar major electrode surface comprising a device second electrical circuit connection to the electrical load; and, a thermal mass material of predetermined thickness and shape between facing second and third planar major surfaces of the PPTC element and the MOV element for controlling transfer of heat from the MOV element to the PPTC element resulting from a said overvoltage/overcurrent condition, such that the PPTC element trips to a high resistance state before the MOV element reaches a failure temperature, and for electrically connecting the PPTC element in series with the MOV element.

14. An electrical circuit comprising:

a power supply for supplying a nominal amount of operating power;

an electrical load normally connected to receive the operating power; and, a series-shunt composite circuit protection device connected between the power supply and the electrical load for responding to a source of transient overvoltage/overcurrent conditions occurring in the electrical circuit between the power supply and the device and comprising:

a polymeric positive temperature coefficient ("PPTC") element connected in series between the power supply and the electrical load and having first and second planar major surfaces, a first electrode sheet formed at the first planar major surface and in intimate electrical contact therewith, and a second electrode sheet formed at the second planar major surface and in intimate electrical contact therewith;

a metal oxide varistor ("MOV") element connected in parallel across the electrical load and having third and fourth planar major electrode surfaces; and, a thermal mass material of predetermined thickness and shape between facing second and third planar major surfaces of the PPTC element and the MOV element for controlling transfer of heat from the MOV element to the PPTC element resulting from a said overvoltage/overcurrent condition such that the PPTC element trips to a high resistance state before the MOV element reaches a failure temperature, and for electrically connecting the second electrode sheet and the third major electrode surface.

15. The electrical circuit set forth in claim 14 wherein the power supply, the electrical load, and the series-shunt composite circuit protection device are part of a telecommunications system.

16. A composite circuit protection device comprising:

a polymeric positive temperature coefficient ("PPTC") element having first and second planar major surfaces, a first electrode sheet formed at the first planar major surface and in intimate electrical contact therewith and having a first connection lead attached thereto, and a second electrode sheet formed at the second planar major surface and in intimate electrical contact therewith;

a metal oxide varistor ("MOV") element having a third major electrode surface and a fourth planar major electrode surface to which a second connection lead is attached;

a thermal mass material between the PPTC element and the MOV element for controlling transfer of heat from the MOV element to the PPTC element such that the PPTC element trips to a high resistance state before the MOV element reaches a failure temperature, and for electrically connecting the second electrode sheet and the third major electrode surface, the thermal mass material comprising a tapered end portion of a third connection lead and a solder material infilling space between the PPTC element and the MOV element not occupied by the tapered end portion;

the first connection lead, the second connection lead and the third connection lead being formed in a pattern suitable for through-hole connections to a circuit board; and, a protective coating covering exterior surfaces of the PPTC element, thermal mass material and MOV element, and not covering the first, second and third connection leads.

17. The composite circuit protection device set forth in claim 16 wherein the thermal mass material has a thickness in a range of 0.025 mm to 2.5 mm (0.001 to 0.100 in).

18. The composite circuit protection device set forth in claim 16 wherein:

the MOV element is a thin ceramic disk comprising zinc oxide having an outer diameter of approximately 10 mm (0.39 inch) and a thickness of approximately 1.3 mm, and has a nominal AC voltage rating of 175 V RMS; and the PPTC element is one of generally a square and slightly tapered box shape of approximately 5.5 mm by 5.5 mm by 2.2 mm, and has a nominal operating voltage of approximately 60 VDC, a fault voltage of approximately 250 VAC RMS and an interrupt or trip current of 3 A RMS.

19. The composite circuit protection device set forth in claim 16 having a structural arrangement capable of withstanding a test impulse comprising 600-volts at 5 amperes over a five second duration without device failure.

* * * * *